United States Patent
Cho et al.

(10) Patent No.: US 8,705,496 B2
(45) Date of Patent: Apr. 22, 2014

(54) METHOD AND APPARATUS FOR CONTROLLING TRANSMISSION AND RECEPTION OF DEDICATED PILOTS ACCORDING TO MCS LEVEL IN A WIRELESS COMMUNICATION SYSTEM

(75) Inventors: Yun-Ok Cho, Suwon-si (KR); Hwan-Joon Kwon, Hwaseong-si (KR); Jin-Kyu Han, Seoul (KR); Yu-Chul Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1849 days.

(21) Appl. No.: 11/655,695

(22) Filed: Jan. 19, 2007

(65) Prior Publication Data

US 2007/0189240 A1 Aug. 16, 2007

(30) Foreign Application Priority Data

Jan. 19, 2006 (KR) .................. 10-2006-0005872
Apr. 5, 2006 (KR) .................. 10-2006-0030930

(51) Int. Cl.
*H04J 3/00* (2006.01)

(52) U.S. Cl.
USPC .................. 370/337; 455/45; 455/42; 455/62

(58) Field of Classification Search
USPC .......... 455/67.11, 115.1–115.4, 226.1–226.4, 455/42, 45, 62; 370/337
See application file for complete search history.

(56) References Cited

U.S. PATENT DOCUMENTS

| 7,145,862 B2 | 12/2006 | Batariere et al. |
| 7,313,124 B2 | 12/2007 | Lim et al. |
| 7,697,466 B2 | 4/2010 | Hashimoto et al. |
| 2005/0124352 A1* | 6/2005 | Fernandez-Corbaton et al. .......... 455/452.2 |
| 2006/0172704 A1* | 8/2006 | Nishio et al. .......... 455/67.11 |
| 2007/0104174 A1* | 5/2007 | Nystrom et al. .......... 370/343 |
| 2008/0232504 A1* | 9/2008 | Ma et al. .......... 375/267 |

FOREIGN PATENT DOCUMENTS

| EP | 1 542 488 | 6/2005 |
| KR | 1020050062331 | 6/2005 |
| KR | 1020050066860 | 6/2005 |
| KR | 1020050122246 | 12/2005 |
| WO | WO 03/028323 | 4/2003 |
| WO | WO 03/079593 | 9/2003 |
| WO | WO 2005/015797 | 2/2005 |

OTHER PUBLICATIONS

O. Simeone et al., Adaptive Pilot Pattern for OFDM Systems, IEEE Communications Society, 2004 IEEE.

* cited by examiner

*Primary Examiner* — Kwasi Karikari
(74) *Attorney, Agent, or Firm* — The Farrell Law Firm, P.C.

(57) ABSTRACT

A method and apparatus for controlling transmission and reception of dedicated pilots according to an MCS level in a wireless communication system are provided, in which an MCS level is determined for a data channel, the amount of resources for sending dedicated pilots is determined in inverse proportion to the MCS level, a pilot channel signal including basic pilots mapped to resources allocated to a pilot channel, a control channel signal including control information mapped to resources allocated to a control channel, and a data channel signal including the dedicated pilots mapped to the determined amount of resources being part of resources allocated to the data channel and data mapped to the remaining of the resources allocated to the data channel are generated, and the pilot channel signal, the control channel signal, and the data channel signal are multiplexed and sent in the mapped resources.

34 Claims, 9 Drawing Sheets

| MCS LEVEL | CODE RATE | MODULATION SCHEME | AMOUNT OF RESOURCES FOR DEDICATED PILOTS(%) |
|---|---|---|---|
| 9 | 3/4 | 16QAM | 0 |
| 8 | 3/4 | QPSK | 0 |
| 7 | 1/2 | 16QAM | 0 |
| 6 | 1/2 | QPSK | 0 |
| 5 | 1/3 | 16QAM | 0 |
| 4 | 1/3 | QPSK | 0 |
| 3 | 1/6 (0.1677) | QPSK | 8.3% (1/12) |
| 2 | 1/12 (0.0833) | QPSK | 16.7% (1/6) |
| 1 | 1/24 (0.0417) | QPSK | 33.3% (1/3) |

FIG.4

METHOD AND APPARATUS FOR CONTROLLING TRANSMISSION AND RECEPTION OF DEDICATED PILOTS ACCORDING TO MCS LEVEL IN A WIRELESS COMMUNICATION SYSTEM

PRIORITY

This application claims priority under 35 U.S.C. §119(a) to an application filed in the Korean Intellectual Property Office on Jan. 19, 2006 and assigned Serial No. 2006-5872 and an application filed in the Korean Intellectual Property Office on Apr. 5, 2006 and assigned Serial No. 2006-30930, the disclosure of which is incorporated herein by reference.

BACKGROUND OF THE INVENTION

1. Field of the Invention

The present invention generally relates to a wireless communication system. More particularly, the present invention relates to a method and apparatus for controlling transmission and reception of dedicated pilots mapped to part of resources allocated to a data channel in a system that adaptively controls a modulation scheme and an error correction code rate.

2. Description of the Related Art

A wireless communication system has a variable-channel environment due to fading caused by the position of a Mobile Station (MS) (or user) or obstacles. A Base Station (BS) scheduler efficiently allocates resources to MSs according to their channel statuses and priority levels at every scheduling point in time, thereby improving system performance.

FIG. 1 illustrates a downlink transmission in a multi-cell wireless communication system. Referring to FIG. 1, reference numerals 110, 120 and 130 denote BSs that cover cells A, B and C, respectively. Reference numerals 111 and 100 denote MSs within cell A, reference numerals 121 and 122 denote MSs within cell B, and reference numeral 131 denotes an MS within cell C.

A measure of the channel status of each MS is Signal-to-Interference and Noise Ratio (SINR). SINR will be described with regard to the MS 131 within cell C. The reception power of a signal from the BS 130 at the MS 131 depends on fading caused by signal attenuation related to the distance between the BS 130 and the MS 131 and by an obstacle 132. A signal sent from the BS 130 in cell C is divided into a line of sight path signal component 133 and multipath signal components 134 and 135, each of which arrive at the MS 131. The multipath signal components 134 and 135 cause fading, thus varying the channel status instantaneously.

The channel status can be measured by interference and noise. This will be described with regard to the MS 112 at the boundary of cell A. The MS 112 receives a signal 123 from the BS 120 in cell B and a signal 136 from the BS 130 in cell C as well as a signal 113 from the BS 110 in cell A. The sum of the signal 113 or 136 and noise signal received from a neighbor cell is an interference and noise component. Since the MS 112 is located at the cell boundary, the ratio of interference from the neighbor cells is high and thus the MS 112 is in a poor channel status with a low SINR under the same fading environment.

Each BS is provided with a scheduler (not shown), for reliable data transmission. The scheduler selects an appropriate Modulation and Coding Scheme (MCS) according to the channel status. The MCS is given in the form of an MCS level. The scheduler selects a low MCS level specifying a low-order modulation and/or a low coding rate such as Quadrature Phase Shift Keying (QPSK) for the MS 112 with a low SINR at the cell boundary, to thereby decrease data rate and ensure reliable transmission. A low coding rate like ⅙ or 1/12 provides almost the same performance as repeated coding that repeats data bits, using more resources for transmission of the same amount of information. In this case, a receiver of the MS 112 increases SINR by combining repeated signal components.

A data channel delivers a data signal along with a control channel carrying control information and a pilot channel for estimating a channel impulse response for use in channel compensation of the data channel and the control channel at the receiver. In general, the data channel, the control channel, and the pilot channel occupy different transmission resources. The transmission resources are time resources and/or frequency resources. In Orthogonal Frequency Division Multiplexing (OFDM), the transmission resources are time-frequency resources.

FIG. 2 illustrates mapping between a data channel, a control channel, and a pilot channel to time-frequency resources in a typical OFDM system. The pilot channel applies commonly to both the data channel and the control channel and thus it is called a common pilot channel. The horizontal axis represents a time domain and the vertical axis represents a frequency domain. The time domain covers a subframe 210 and the frequency domain covers a total frequency band. A basic transmission unit in frequency is a subband 220 including one subcarrier or a set of subcarriers. One subframe carries a plurality of OFDM symbols.

In the illustrated case of FIG. 2, a common pilot channel 230 is allocated to odd-numbered subcarriers/subbands, and a control channel 240 is allocated to even-numbered subcarriers/subbands in a first OFDM symbol. The remaining resources are allocated to data channels for users, including a data channel 250 for user A.

As described before, compared to data or control information of which the received SINR can be increased by the use of a low MCS level, the pilot channel sends a predetermined amount of pilot symbols and thus there is no way to increase received pilot SINR. For a user in a poor channel status, despite an increased received SINR for data by use of a low MCS level, the degradation of channel estimation performance resulting from low pilot SINR decreases system reception performance.

SUMMARY OF THE INVENTION

An aspect of the present invention is to address at least the problems and/or disadvantages set forth above and to provide at least the advantages described below. Accordingly, an aspect of the present invention is to provide a method and apparatus for controlling transmission of dedicated pilots according to the MCS level of transmitted data, for use in channel estimation of a data channel.

Moreover, an aspect of the present invention provides a method and apparatus for transmitting dedicated pilots using part of the resources allocated to data, when the data is sent using a low MCS level.

In accordance with an aspect of the present invention, there is provided a method of controlling the transmission of dedicated pilots in a wireless communication system, in which an MCS level is determined for a data channel, the amount of resources for sending dedicated pilots is determined in inverse proportion to the MCS level, a pilot channel signal including basic pilots mapped to resources allocated to a pilot channel, a control channel signal including control information mapped to resources allocated to a control channel, and a data channel signal including the dedicated pilots mapped to the determined amount of resources being part of the resources allocated to the data channel and data mapped to the remaining of the resources allocated to the data channel are generated, and the pilot channel signal, the control channel signal, and the data channel signal are multiplexed and sent in the mapped resources.

In accordance with another aspect of the present invention, there is provided a method of controlling the reception of dedicated pilots in a wireless communication system, in which a pilot channel signal including basic pilots is received through resources allocated to a pilot channel, a first channel estimate is calculated using the basic pilots, a control channel signal including control information is received through resources allocated to a control channel, and acquiring the control information using the first channel estimate, the amount of resources for dedicated pilots is determined in inverse proportion to an MCS level of the data channel indicated by the control information, a data channel signal including the dedicated pilots mapped to the determined amount of the resources being part of the resources allocated to the data channel and data mapped to the remaining of the resources allocated to the data channel is received through resources allocated to the data channel, a second channel estimate is calculated using the basic pilots and the dedicated pilots, and the data is acquired from the data channel signal using at least one of the first channel estimate and the second channel estimate.

In accordance with a further aspect of the present invention, there is provided an apparatus for controlling the transmission of dedicated pilots in a wireless communication system, in which a scheduler determines an MCS level for a data channel, and determines the amount of resources for dedicated pilots in inverse proportion to the MCS level, a pilot channel generator generates basic pilots to be mapped to resources allocated to a pilot channel and the dedicated pilots to be mapped to the determined amount of resources being part of resources allocated to a data channel, a control channel generator generates control information to be mapped to resources allocated to a control channel, a data channel generator generates data to be mapped to the remaining of the resources allocated to the data channel except for the resources allocated to the dedicated pilots, and a resource mapper generates a pilot channel signal by mapping the basic pilots to the resources allocated to the pilot channel, a control channel signal by mapping the control information to the resources allocated to the control channel, and a data channel signal by mapping the dedicated pilots and the data to the resources allocated to the data channel, multiplexes the pilot channel signal, the control channel signal, and the data channel signal, and sends the multiplexed signal in the mapped resources.

In accordance with still another aspect of the present invention, there is provided an apparatus for controlling the reception of dedicated pilots in a wireless communication system, in which a resource demapper demaps a signal received from a transmitter into a data channel signal received through resources allocated to a data channel, a control channel signal received through resources allocated to a control channel, and a pilot channel signal received through resources allocated to a pilot channel, a channel estimator calculates a first channel estimate using basic pilots included in the pilot channel signal, and if the data channel signal includes dedicated pilots, calculates a second channel estimate using the dedicated pilots, a control channel receiver acquires control information indicating an MCS level used for the data channel using the first channel estimate, determines the amount of resources for the dedicated pilots in inverse proportion to the MCS level of the data channel, and provides the determined amount of resources for the dedicated pilots to the channel estimator, and a data channel receiver acquires data from the data channel signal using at least one of the first channel estimate and the second channel estimate.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIG. 4 illustrates an exemplary look-up table listing the percentage of dedicated pilots relative to dedicated resources with respect to MCS levels;

DETAILED DESCRIPTION OF PREFERRED EMBODIMENTS

The matters defined in the description such as a detailed construction and elements are provided to assist in a comprehensive understanding of the present invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention controls transmission of dedicated pilots for use in channel estimation of data, according to the MCS level of the transmitted data. Especially as data is sent using a lower MCS level, dedicated pilots are sent using more resources. It is said that a low MCS level is used in the case where a relatively low-order modulation scheme such as QPSK is used, a relatively low coding rate is used, or a low-order modulation scheme and a low coding rate are used.

While the present invention is described in the context of downlink communications in an Orthogonal Frequency Division Multiple Access (OFDMA) wireless communication system, it is to be clearly understood to those skilled in the art that transmission of dedicated pilots in the present invention can be implemented in other mobile communication systems with a similar technological background and channel configuration with a slight modification, and remain within the scope of the present invention.

Figure 3:
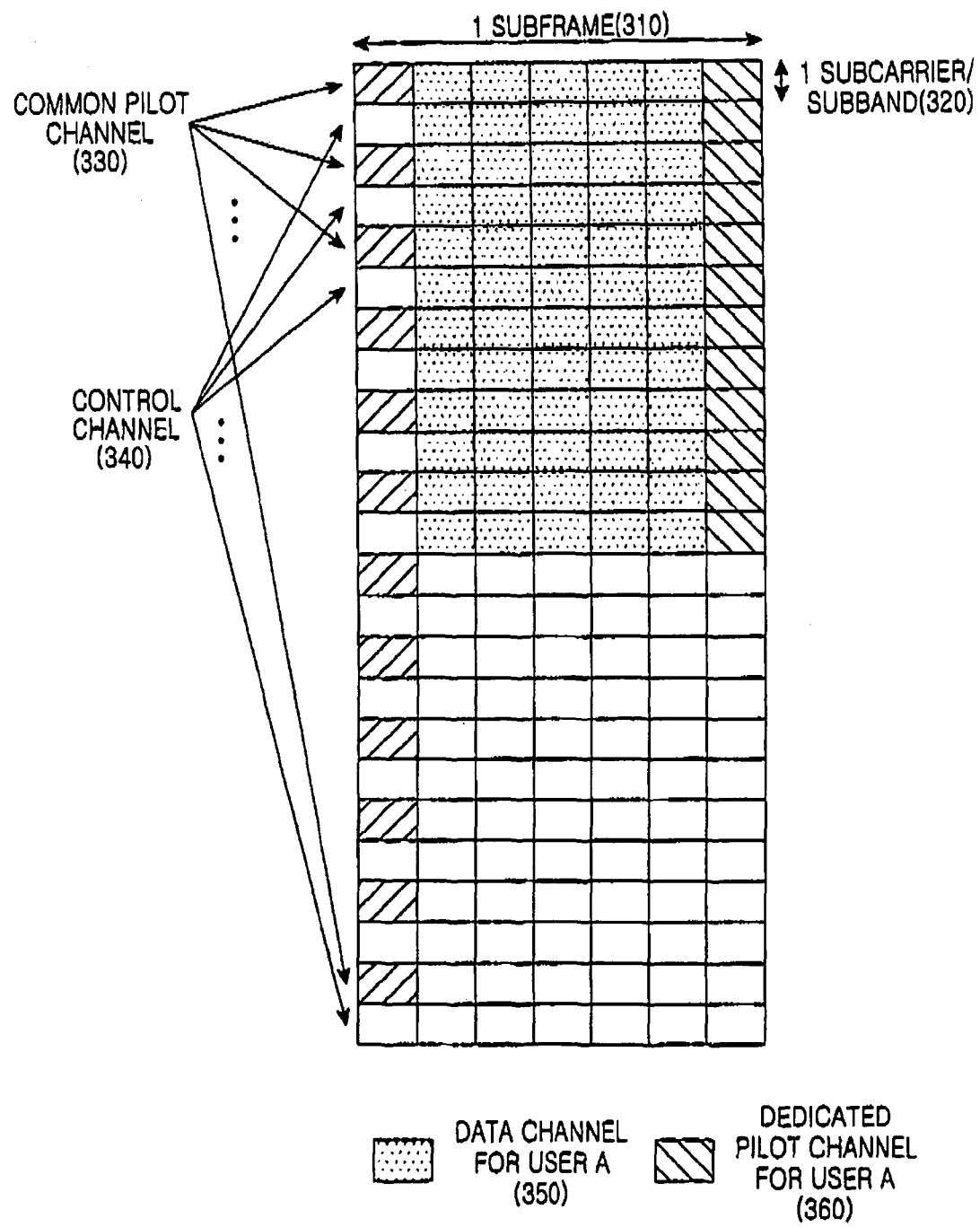
FIG. 3 illustrates transmission of dedicated pilots in an OFDM system according to the present invention.

FIG. 3 illustrates transmission of dedicated pilots in an OFDM system according to the present invention. A data channel, a control channel, and a pilot channel are multiplexed and mapped to time-frequency resources.

Referring to FIG. 3, the horizontal axis represents a time domain and the vertical axis represents a frequency domain.

Figure 1:
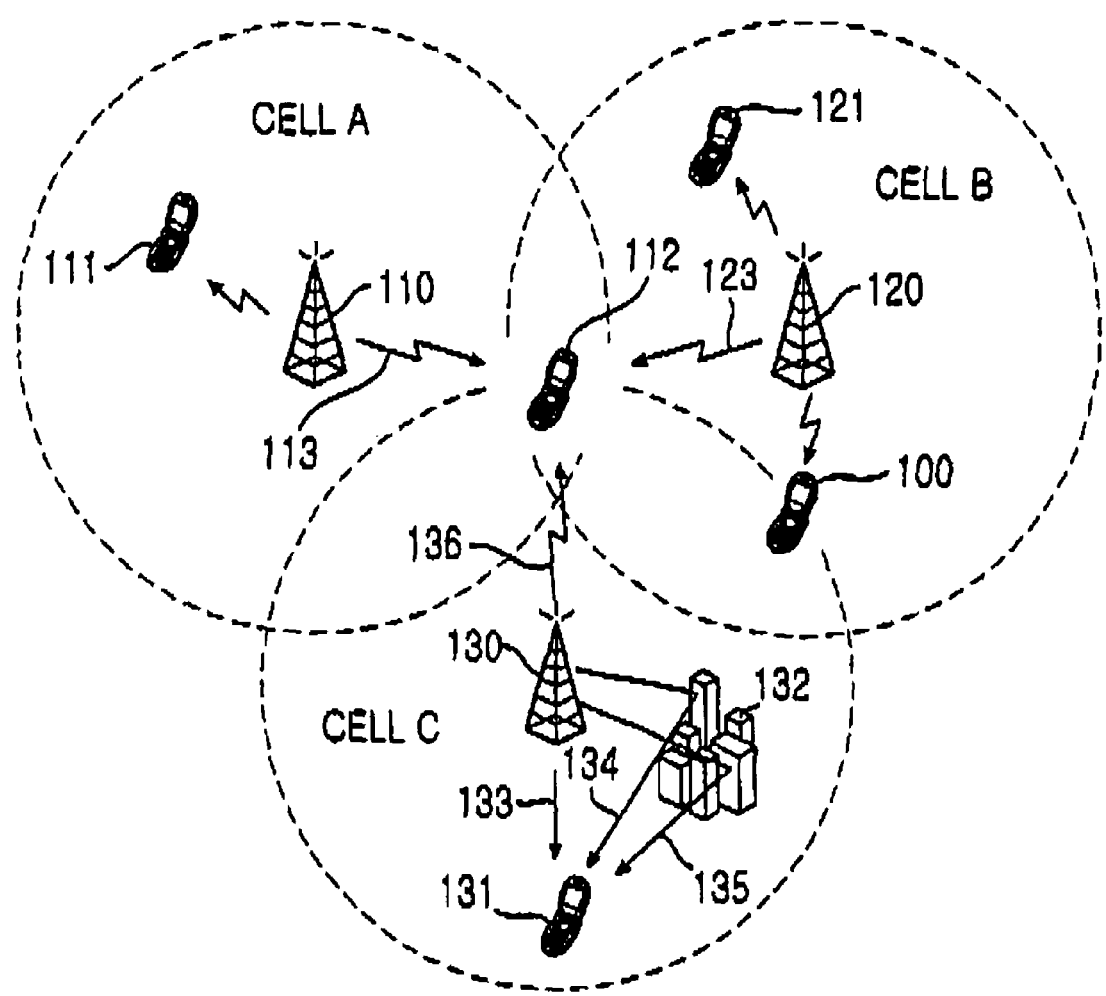
FIG. 1 illustrates the configuration of a typical wireless communication system.
Figure 2:
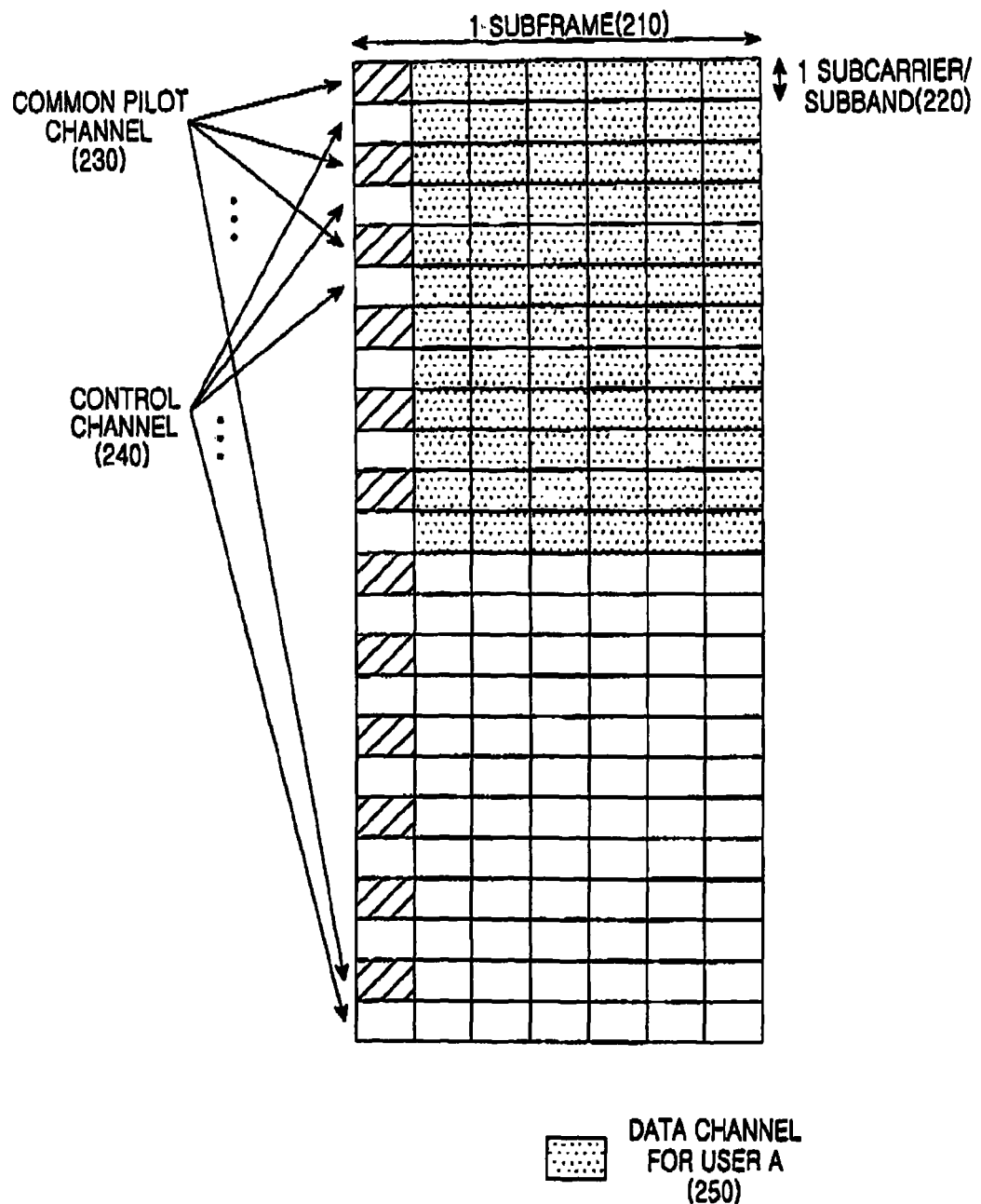
FIG. 2 illustrates channel mapping in a typical OFDM system.

The time domain covers a subframe 310 and the frequency domain covers a total frequency band. A basic transmission unit in frequency is a subband 320 including one subcarrier or a set of subcarriers. A pilot channel 330 and a control channel 340 are mapped to resources in a first OFDM symbol in the manner described before with reference to FIG. 2. Dedicated resources for user A are allocated separately to a data channel 350 and a dedicated pilot channel 360. The pilot channel 330 sent in the first OFDM symbol is called a common pilot channel distinguishably from the dedicated pilot channel 360. Because the dedicated pilot channel 360 occupies part of the dedicated resources that otherwise might be further allocated to the data channel 350, data bits of the data channel 350 can be punctured, taking into account the amount of resources allocated to the dedicated pilot channel 360 during generation of the data channel 350.

When a low MCS level is used, there is a limit to the gain that can be achieved by reducing the coding rate of the data channel. Therefore, channel estimation performance is increased by using part of the dedicated resources allocated to a specific user for transmission of a dedicated channel signal to the user, thereby increasing the reception performance of a data channel in accordance with the present invention. The amount of pilot symbols sent on the dedicated pilot channel is determined according to the amount of resources allocated for the dedicated pilot channel, corresponding to the MCS level of the data channel. The amount of resources allocated for the dedicated pilot channel is determined using a predetermined formula or referring to a predetermined look-up table.

FIG. 4 illustrates an exemplary look-up dedicated pilots listing the percentage of dedicated pilots relative to dedicated resources with respect to MCS levels. Each MCS level specifies one of modulation schemes QPSK and 16-ary Quadrature Amplitude Modulation (16QAM), and one of coding rates, $1/24$, $1/12$, $1/6$, $1/3$, $1/2$, and $3/4$. Referring to FIG. 4, 8.3% ($=1/12$), 6.7% ($=1/6$), and 33.3% ($=1/3$) of dedicated resources are allocated to the dedicated pilot channel, respectively, for MCS levels 3, 2 and 1 specifying relatively low coding rates of $1/6$, $1/12$ and $1/24$ and a relatively low-order modulation scheme like QPSK.

The configurations of a transmitter for transmitting dedicated pilots and a receiver for receiving the dedicated pilots in accordance with the present invention will be described below. For notational simplicity, downlink resources are allocated to one user in the following description. Yet, it is clear that the same description can be applied to a plurality of users on the uplink or the downlink without a great modification.

Figure 5:
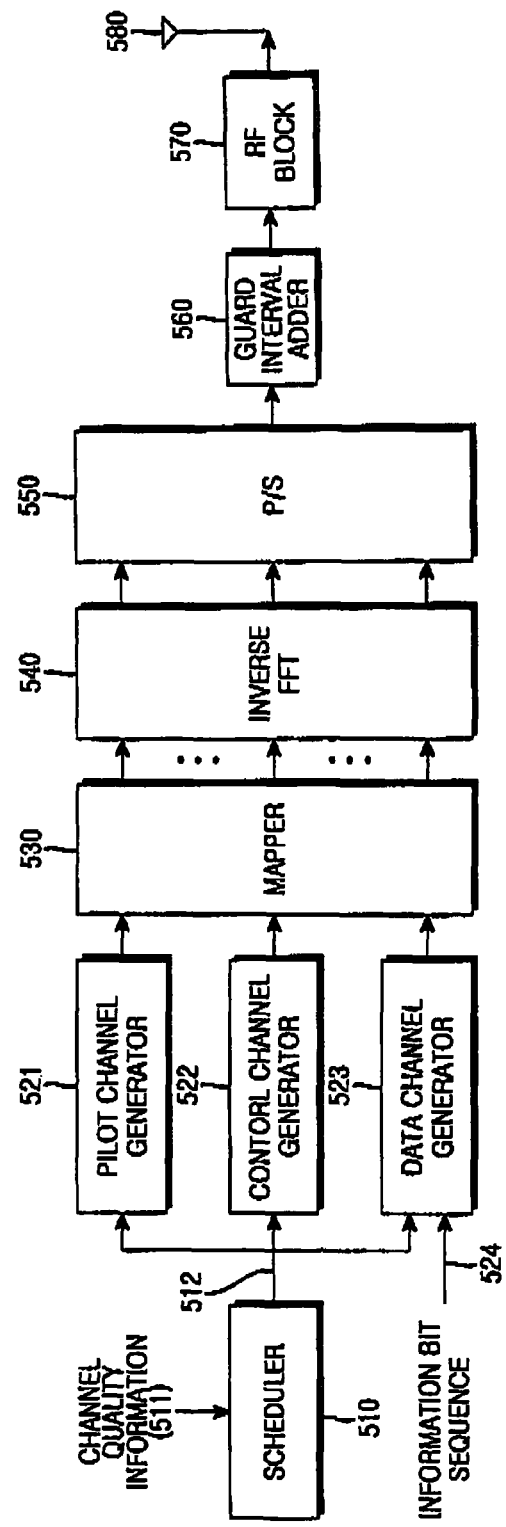
FIG. 5 is a block diagram of a transmitter for transmitting dedicated pilots according to the present invention.

FIG. 5 is a block diagram of a transmitter for transmitting dedicated pilots according to the present invention.

Referring to FIG. 5, a scheduler 510 allocates available resources for a current scheduling period to a user and selects an appropriate MCS level for the user according to channel information 511 of the user. Resource allocation information indicating the selected MCS level is provided to a pilot channel generator 521, a control channel generator 522, and a data channel generator 523 in a scheduler output signal 512.

The scheduler output signal 512 includes dedicated pilot allocation information indicating the number and positions of dedicated pilots decided by the scheduler 510 as well as resource allocation information for each channel. If the positions of the dedicated pilots are determined such that they are sequentially disposed, starting from the top (e.g. the first channel) of the dedicated resources allocated to a data channel or starting from the bottom (e.g. the last subcarrier) of the dedicated resources, information about the positions of the dedicated pilots may not be included in the dedicated pilot allocation information. For notational simplicity, it is assumed herein that the start of the dedicated pilots is preset and the dedicated pilot allocation information indicates the amount of the dedicated pilots. The dedicated pilot allocation information may further indicate whether or not dedicated pilots are sent depending on whether the amount of dedicated pilots is 0 or a non-zero value.

If the scheduler output signal 512 includes the dedicated pilot allocation information, the pilot channel generator 521 generates common pilots and dedicated pilots based on the dedicated pilot allocation information. The common pilot signal and the dedicated pilot signal have the same or different pilot symbols. In the absence of the dedicated pilot allocation information, the pilot channel generator 521 generates only the common pilots. The dedicated pilot allocation information is decided by the scheduler 510 or by external signaling.

For the input of an information bit sequence, the data channel generator 523 generates pure data including transmission data symbols according to the scheduler output signal 512. "Pure" means that the data does not includes the dedicated pilots. The detailed structure of the data channel generator 523 will be described later with reference to FIG. 6. The control channel generator 522 encodes and modulates the scheduler output signal, thus creating a control signal including control information symbols.

A resource mapper 530 maps the pilot signal(s), control information, and pure data generated from the channel generators 521, 52 and 523 to predetermined time-frequency resources, thus converting them to a pilot channel signal(s), a control channel signal, and a pure data channel signal. If it is determined to send the dedicated pilots, the pure data are mapped together with the dedicated pilots to dedicated resources allocated to the data channel. As a consequence, a data channel signal including the dedicated pilots is created.

An Inverse Fast Fourier Transformer (IFFT) 540 converts the signals received from the resource mapper 530 to time-domain signals by multi-carrier modulation. A Parallel-to-Serial (P/S) Converter 550 converts the time-domain signals to a serial signal (i.e. OFDM symbols). A guard interval adder 560 adds a guard interval between the OFDM symbols to avoid Inter-Symbol Interference (ISI). The guard interval can be a Cyclic Prefix (CP) being a copy of part of an OFDM symbol. The guard interval-added OFDM symbols are sent through a Radio Frequency (RF) block 570 and a transmit antenna 580.

Figure 6:
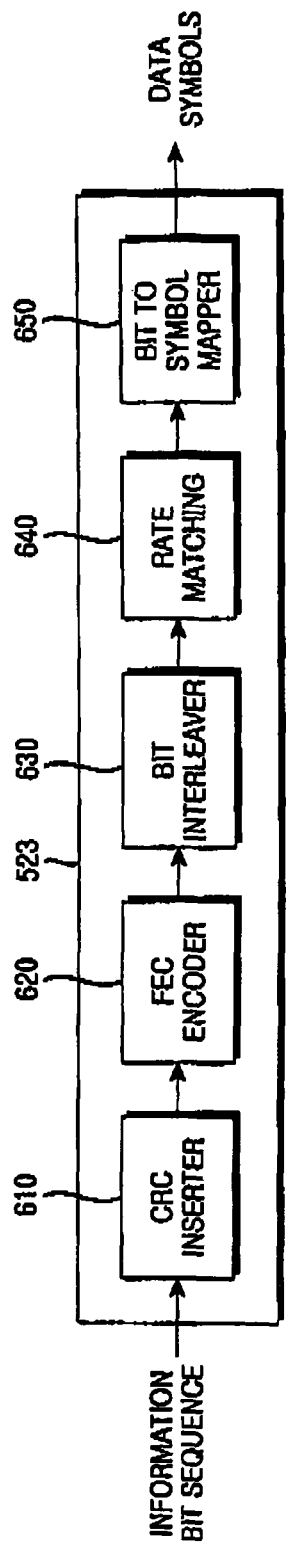
FIG. 6 is a block diagram of a data channel generator according to the present invention.

FIG. 6 is a detailed block diagram of the data channel generator 523 for generating the pure data channel signal.

Referring to FIG. 6, a Cyclic Redundancy Check (CRC) inserter 610 adds error detection code (e.g. CRC) bits to an information bit sequence. A Forward Error Correction (FEC) encoder 620 encodes the signal received from the CRC inserter 610 at a coding rate specified by an MCS level indicated by the scheduler output signal 512. A bit interleaver 630 interleaves the coded bit sequence received from the FEC encoder 620.

A rate matcher 640 matches the number of the interleaved bits to an actual data rate by puncturing or repeating the interleaved bits. If the scheduler output signal 512 indicates the presence of dedicated pilots, this implies that the amount of resources for data symbols is reduced. Thus, the rate matcher 640 punctures more bits or repeats fewer bits than in the case of the non-transmission of the dedicated pilots. A bit-to-symbol mapper 650 maps the rate-matched bit sequence to predetermined data symbols. The rate matcher 640 and the bit-to-symbol mapper 650 operate in accordance with the MCS level indicated by the scheduler output signal 512.

If downlink resources are allocated to two or more users, the BS includes the control channel generator 522 and the data channel generator 523 for each of the users. Control channel signals and data channel signals for the users are multiplexed with a common pilot channel signal in the resource mapper 530. Part of the data channel signals may include dedicated pilots. On the uplink, since basic dedicated pilots corresponding to the downlink common pilots are already specified, dedicated pilots sent using data channel resources are called additional dedicated pilots.

As described above, part of time-frequency resources allocated to a data channel are used for dedicated pilots on the downlink. Similarly, part of time-frequency resources allocated to a data channel are used for additional dedicated pilots on the uplink. Transmission and reception of basic dedicated pilots and additional dedicated pilots on the uplink are carried out in the same manner as with transmission and reception of common pilots and dedicated pilots on the downlink described herein.

For the uplink, a total pilot SINR can be increased by additionally allocating part of the power allocated to the data channel to the basic dedicated pilots. It is to be appreciated herein that time-frequency resources and power are radio resources in a broad sense. It can be further contemplated as another embodiment of the present invention that part of the time-frequency resources allocated to the data channel are used for the additional dedicated pilots and simultaneously, part of power resources allocated to the data channel is used for the basic dedicated pilots or the additional dedicated pilots.

Figure 7:
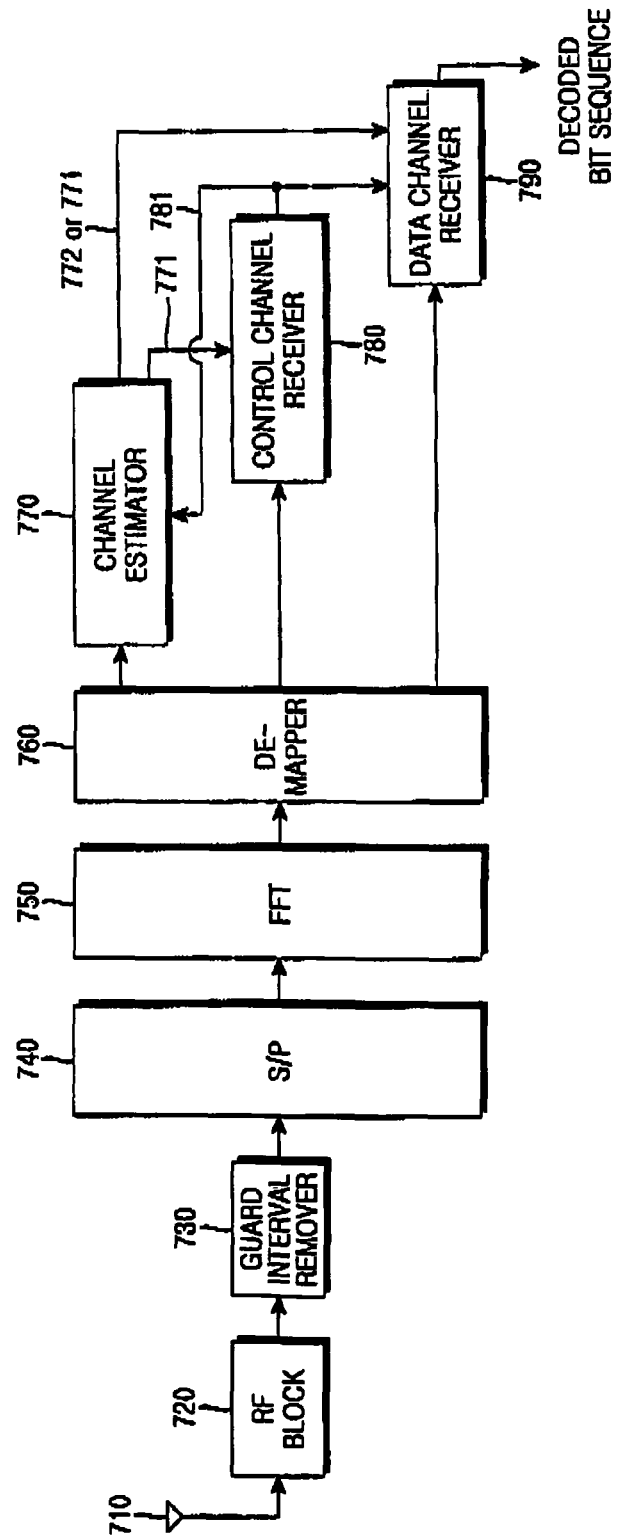
FIG. 7 is a block diagram of a receiver for receiving dedicated pilots according to the present invention.

FIG. 7 is a block diagram of a receiver for receiving dedicated pilots according to the present invention.

Referring to FIG. 7, an RF processor 720 downconverts to a baseband signal a signal received through a receive antenna 710. A guard interval remover 730 eliminates a guard interval from the baseband signal, thus outputting an OFDM signal. A Serial-to-Parallel (S/P) converter 740 converts the OFDM signal to parallel signals. A Fast Fourier Transformer (FFT) 750 converts the parallel time-domain signals to frequency-domain signals. A resource demapper 760 demultiplexes the frequency-domain signals into a pilot channel signal including common pilots, a control channel signal, and a data channel signal that may include dedicated pilots and provides the pilot channel signal to a channel estimator 770, the control channel signal to a control channel receiver 780, and the data channel signal to a data channel receiver 790.

The channel estimator 770 calculates a first channel estimate 771 using the common pilot signal. The control channel receiver 780 compensates the control channel signal using the first channel estimate 771 and extracts control information 781. The control information 781 indicates the MCS level of a data channel signal, the presence or absence of dedicated pilots, and the amount of the dedicated pilots. The control information 781 is provided to the channel estimator 770 and the data channel receiver 790.

If the control information 781 indicates the presence of dedicated pilots, the channel estimator 770 calculates a second channel estimate 772 using the common pilots and the dedicated pilot included in the data channel signal and provides the second channel estimate 772 to the data channel receiver 790. On the other hand, if the control information 781 indicates the absence of dedicated pilots, the channel estimator 770 provides the first channel estimate 771 to the data channel receiver 790. The data channel receiver 790 channel-compensates the data channel signal using the first or second channel estimate and demodulates and decodes the channel-compensated data channel signal using the control information 781, thereby extracting the original information bit sequence. According to the amount of the dedicated pilots, the data channel receiver 790 combines repeated bits of the channel-compensated data channel signal or depunctures punctured bits of the channel-compensated data channel signal during decoding.

As described above, the presence or absence of dedicated pilots and the amount of the dedicated pilots are determined according to the MCS level of the data channel in one of the following embodiments of the present invention.

In an embodiment of determining the presence or absence of dedicated pilots and the amount of the dedicated pilots, an MCS level threshold is used to decide whether to send the dedicated pilots. The transmitter compares the MCS level of the data channel with the threshold and, if the MCS level is greater than the threshold, the transmitter does not send the dedicated pilots. If the MCS level is less than or equal to the threshold, the transmitter uses part of dedicated resources allocated to the data channel for the dedicated pilots. The receiver additionally considers the dedicated pilots for channel estimation. The threshold and the amount of the dedicated pilots can be set according to the radio transmission scheme and characteristics of the data channel. For example, different thresholds and different numbers of dedicated pilots are set for localized transmission and distributed transmission in OFDM. The localized transmission scheme allocates successive subcarriers to the data channel, whereas the distributed transmission scheme allocates subcarriers apart from one another by a predetermined spacing over a total frequency band to the data channel.

In another embodiment of determining the presence or absence of dedicated pilots and the amount of the dedicated pilots, the presence or absence of dedicated pilots and the amount of the dedicated pilots are tabulated with respect to available MCS levels as illustrated in FIG. 4. If the amount of dedicated pilots corresponding to the MCS level of the data channel is 0, the transmitter does not send the dedicated pilots. If the amount of the dedicated pilots exceeds 0, the transmitter uses part of dedicated resources allocated to the data channel for the dedicated pilots. The receiver additionally considers the dedicated pilots for channel estimation. The look-up table can be set according to the radio transmission scheme and characteristics of the data channel. For example, different look-up tables are set for localized transmission and distributed transmission in OFDM.

Both the transmitter and the receiver should have information identifying the presence or absence of dedicated pilots and the amount of the dedicated pilots, for successful data transmission/reception. Information about the presence or absence of dedicated pilots and the amount of the dedicated pilots is identified by one of the following embodiments.

In accordance with an embodiment of identifying information about the dedicated pilots, information about the presence or absence of dedicated pilots and the amount of the dedicated pilots is preset in the BS and the MS during system/MS implementation. Even though no need for additional signaling is required, the dedicated pilot information should be specified in the standards.

In accordance with another embodiment of notifying information about dedicated pilots, the BS broadcasts a criterion for deciding as to the presence or absence of dedicated pilots and the amount of the dedicated pilots to all users within the cell. The broadcasting is performed each time the criterion is changed. The criterion includes an MCS level threshold or a look-up table listing numbers of dedicated pilots versus MCS levels. The transmitter determines whether to send dedicated pilots by comparing the criterion with the MCS level of the data channel and sends the amount of dedicated pilots decided by the criterion, if the transmitter decides to send the dedicated pilots. The receiver can find out if the dedicated pilots have been transmitted according to the criterion and the MCS level. If the dedicated pilots have been transmitted, the receiver performs channel estimation by additionally using the dedicated pilots.

In accordance with a third embodiment of notifying information about dedicated pilots, the BS scheduler decides as to the presence or absence of dedicated pilots and the amount of the dedicated pilots for each user according to its own criterion and signals the resulting dedicated pilot information to the user. Since basic dedicated pilots corresponding to downlink common pilots are already specified for the uplink, dedicated pilots sent using data resources on the uplink are called additional dedicated pilots to distinguish from the basic dedicated pilots. Dedicated pilot information is sent each time data is transmitted. Users receive the dedicated pilot information and perform transmission of additional dedicated pilots or reception of dedicated pilots.

Now the transmission and reception of dedicated pilots according to the present invention will be described. For notational simplicity, downlink resources are allocated to one user in the following description. Yet, it is clear that the same description can be applied to a plurality of users on the uplink or the downlink without great modification.

Figure 8:
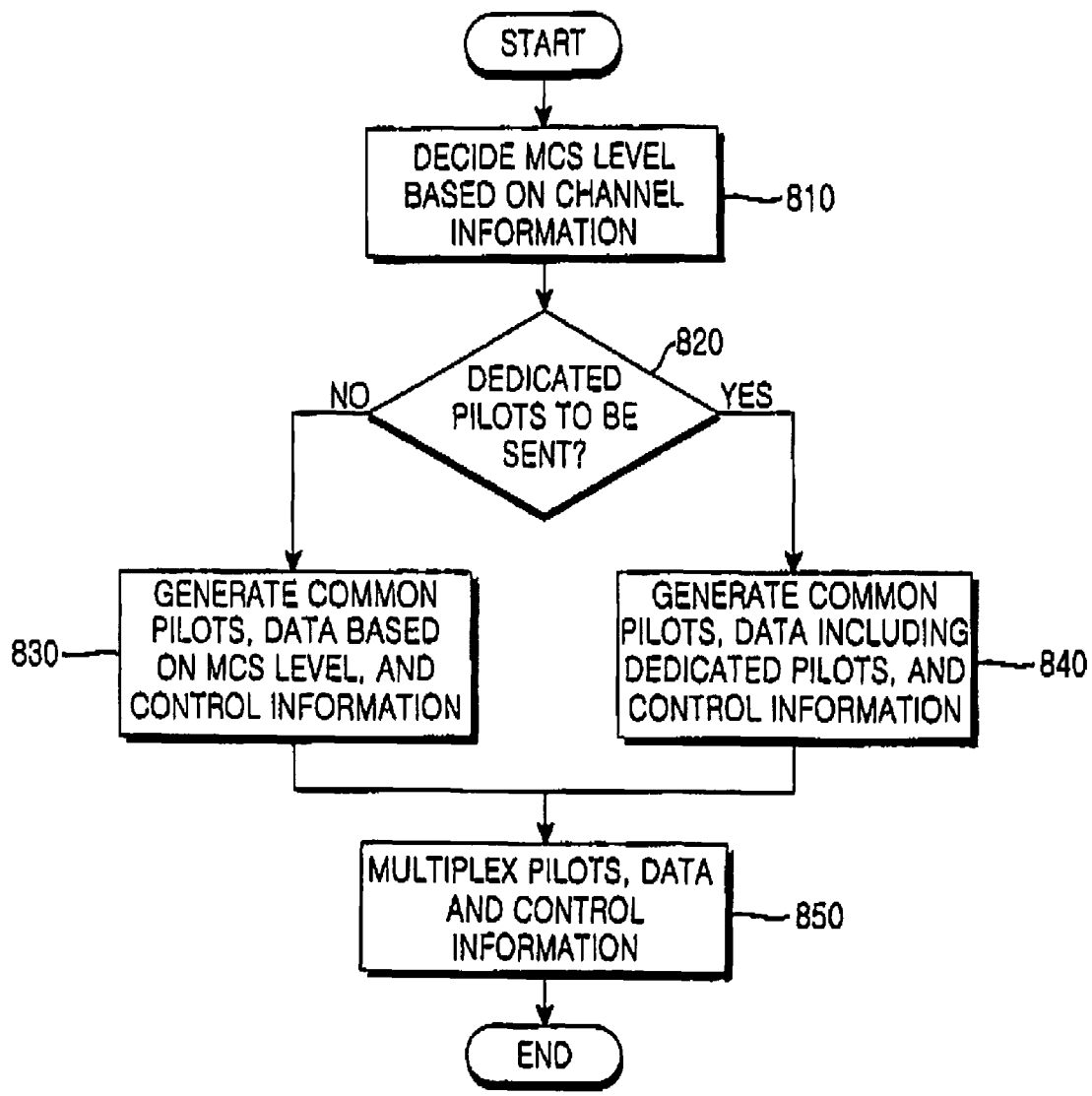
FIG. 8 is a flowchart illustrating a dedicated pilot transmission operation according to the present invention.

FIG. 8 is a flowchart illustrating a dedicated pilot transmission operation according to the present invention.

Referring to FIG. 8, the transmitter, in step 810, determines to allocate resources to a user and selects an MCS level for the user based on channel information of the user and, in step 820, determines whether to send dedicated pilots according to the MCS level. A threshold or a look-up table by which the determination is made is identified to the transmitter and the receiver by one of the above-described embodiments of the present invention or in any other way.

If the transmitter determines not to send dedicated pilots, the transmitter in step 830 generates a pilot channel signal including common pilots, a data channel signal, and a control channel signal. On the contrary, if the transmitter determines to send dedicated pilots, in step 840, generates a pilot channel signal including common pilots, a data channel signal including dedicated pilots and data, and a control channel signal. The data included in the data channel signal is rate-matched, considering a decrease in dedicated resources brought about by transmission of the dedicated pilots. In step 850, the transmitter multiplexes the pilot channel signal, the data channel signal, and the control channel signal, maps the multiplexed signal to predetermined resources, and sends it. The dedicated pilots included in the data channel signal are mapped to part of the dedicated resources allocated to the data channel.

If a plurality of users exist on the downlink, the BS repeats steps 820 to 850 for each user. For the uplink, an MS performs the steps described in FIG. 8. Notably, basic dedicated pilots corresponding to the downlink common pilots are already specified for the uplink. Thus dedicated pilots sent using data resources on the uplink are called additional dedicated pilots to distinguish from the basic dedicated pilots.

Figure 9:
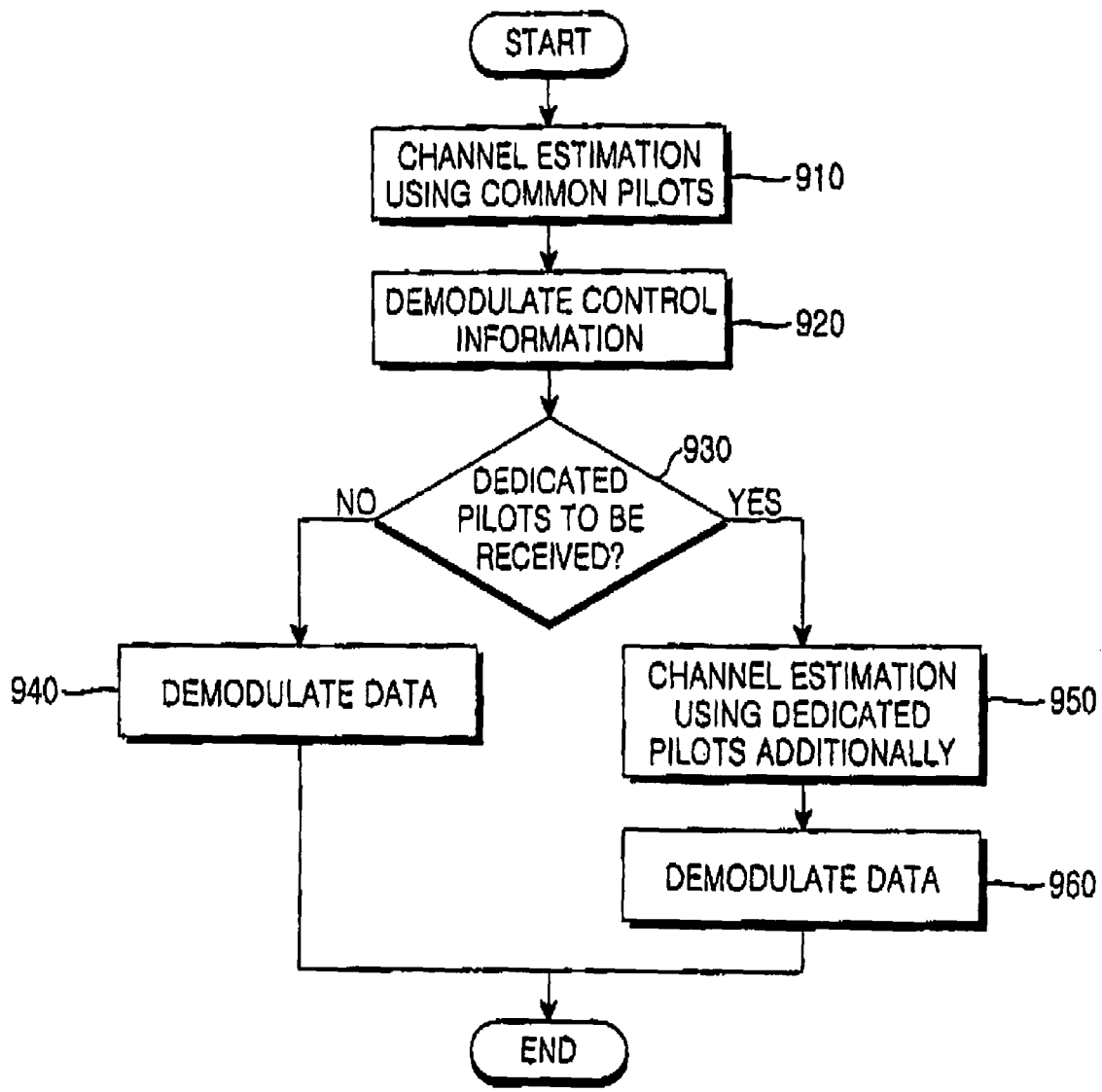
FIG. 9 is a flowchart illustrating a dedicated pilot reception operation according to the present invention.

FIG. 9 is a flowchart illustrating a dedicated pilot reception operation according to the present invention.

Referring to FIG. 9, in step 910, the receiver performs channel estimation using common pilots received in pilot channel resources. In step 920, the receiver acquires control information by demodulating and decoding a control channel signal received in control channel resources using a first channel estimate obtained from the channel estimation. The receiver, in step 930, determines the presence or absence of dedicated pilots and the amount of the dedicated pilots, referring to the MCS level of a data channel indicated by the control information. A threshold and a look-up table by which the determination is made are identified to the transmitter and the receiver by one of the afore-described embodiments of the present invention, or in any other way.

In the absence of dedicated pilots, the receiver, in step 940, acquires an information bit sequence by demodulating and decoding a data channel signal received in data channel resources using the first channel estimate. In this case, the data channel signal is received in whole dedicated resources allocated to the data channel. On the contrary, in the presence of dedicated pilots, the receiver, in step 950, calculates a second channel estimate using the common pilots received in the pilot channel resources and dedicated pilots received in part of the data channel resources, and in step 960, acquires an information bit sequence by demodulating and decoding a pure data channel signal except the dedicated pilots using the second channel estimate. In this case, the pure data channel signal has been received in the remaining dedicated resources except for the resources occupied by the dedicated pilots.

If a plurality of users exist on the downlink, the BS repeats the steps illustrated in FIG. 9 for each user. For the uplink, basic dedicated pilots corresponding to downlink common pilots are already specified. Thus dedicated pilots sent using data resources on the uplink are called additional dedicated pilots distinguishably from the basic dedicated pilots.

As another embodiment of the present invention, a Multiple Input Multiple Output (MIMO) system using multiple transmit and receive antennas will be described. When a plurality of transmit and receive antennas are used for the downlink, common pilot channel signals sent through the respective antennas are mutually orthogonal, for use in channel estimation on an antenna-by-antenna basis. Therefore, as more antennas are used, total pilot overhead for achieving the same performance for each antenna is increased.

In the case where part of the dedicated resources allocated to the data channel are used for the dedicated pilots in accordance with the present invention, the dedicated pilots are sent to a specific user only. Hence, pilots can be sent on an antenna basis depending on a multiple antenna technology used for the user.

For example, if a BS with four transmit antennas sends data to a user through two transmit antennas, dedicated pilots sent through the two transmit antennas are configured to be mutually orthogonal. In another example, if data is sent to a user by beamforming, dedicated pilots for the user are beamformed similarly to a data signal for the user. Instead of transmission of orthogonal dedicated pilots through the four transmit antennas, the transmission of one beamformed dedicated pilot signal prevents unnecessary resource consumption. In a further example, if a data channel signal is sent to a user by a plurality of beams, the BS sends orthogonal dedicated pilots using the plurality of beams. If interference is allowed between beams, the BS sends the dedicated pilots using common resources.

The user sends additional dedicated pilots according to the used multiple antenna technology on the uplink.

In accordance with the present invention as described above, whether to send dedicated pilots and the amount of the dedicated pilots to be sent are decided according to an MCS level used for data transmission. That is, if a low MCS level is used, the dedicated pilots are sent using part of dedicated resources allocated to a data channel on the downlink or the uplink. Therefore, channel estimation performance that determines system performance is increased.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method of controlling transmission of dedicated pilots in a wireless communication system, comprising:
   determining a Modulation and Coding Scheme (MCS) level for a data channel;
   determining amount of resources required for sending dedicated pilots in inverse proportion to the MCS level;
   determining that the dedicated pilots will be sent, if the MCS level is less than or equal to a predetermined threshold; and
   determining to map the dedicated pilots to the determined amount of resources being part of the resources allocated to the data channel, when it is determined that the dedicated pilots will be sent;
   generating a pilot channel signal including basic pilots mapped to resources allocated to a pilot channel, a control channel signal including control information mapped to resources allocated to a control channel, and a data channel signal including the dedicated pilots mapped to the determined amount of resources being part of resources allocated to the data channel and data mapped to remaining resources allocated to the data channel; and
   multiplexing the pilot channel signal, the control channel signal, and the data channel signal and sending the multiplexed signal in the mapped resources.

2. The method of claim 1, wherein generating a data channel signal comprises generating the data by puncturing or repeating a coded information bit sequence to be sent on the data channel according to the determined amount of resources for the dedicated pilots.

3. The method of claim 1, wherein determining the amount of resources for sending dedicated pilots comprises determining at least one of whether the dedicated pilots will be sent, a ratio of the dedicated pilots relative to the resources allocated to the data channel, and the position of the resources for the dedicated pilots, according to the determined MCS level for the data channel.

4. The method of claim 3, further comprising generating a data channel signal including data mapped to the resources allocated to the data channel without the dedicated pilots, if it is determined that the dedicated pilots will not be sent.

5. The method of claim 1, wherein the threshold is determined according to a radio transmission scheme of the data channel and characteristics of the data channel, and broadcast by a system.

6. The method of claim 3, wherein determining at least one of whether the dedicated pilots will be sent, a ratio of the dedicated pilots relative to the resources allocated to the data channel, and the position of the resources for the dedicated pilots comprises determining whether the dedicated pilots will be sent and the amount of resources for the dedicated pilots according to the MCS level, referring to a look-up table listing transmission or non-transmission of dedicated pilots and amounts of resources for the dedicated pilots with respect to available MCS levels for the data channel.

7. The method of claim 6, wherein the look-up table is determined according to a radio transmission scheme of the data channel and characteristics of the data channel, and broadcast by a system.

8. The method of claim 1, further comprising sending dedicated pilot information indicating at least one of transmission or non-transmission of the dedicated pilots, the amount of resources for the dedicated pilots, and the position of the resources for the dedicated pilots.

9. The method of claim 1, wherein the dedicated pilots are used together with the basic pilots for channel estimation and channel compensation of the data channel.

10. A method of controlling reception of dedicated pilots in a wireless communication system, comprising:
    receiving through resources allocated to a pilot channel a pilot channel signal including basic pilots, and calculating a first channel estimate using the basic pilots;
    receiving through resources allocated to a control channel a control channel signal including control information, and acquiring the control information using the first channel estimate;
    determining amount of resources for dedicated pilots in inverse proportion to a Modulation and Coding Scheme (MCS) level of the data channel indicated by the control information;
    determining that the dedicated pilots will be received, if the MCS level is less than or equal to a predetermined threshold; and
    determining to map the dedicated pilots to the determined amount of resources being part of the resources allocated to the data channel, when it is determined that the dedicated pilots will be received;
    receiving through resources allocated to the data channel a data channel signal, the data channel signal including the dedicated pilots mapped to the determined amount of resources being part of the resources allocated to the data channel and data mapped to remaining resources allocated to the data channel, and calculating a second channel estimate using the basic pilots and the dedicated pilots; and
    acquiring the data from the data channel signal using at least one of the first channel estimate and the second channel estimate.

11. The method of claim 10, wherein acquiring the data from the data channel signal comprises outputting a coded information bit sequence by combining repeated bits included in the data or depuncturing punctured bits of the data, according to the amount of resources for the dedicated pilots.

12. The method of claim 10, wherein determining the amount of resources for dedicated pilots comprises determining at least one of whether the dedicated pilots will be received, a ratio of the dedicated pilots relative to the resources allocated to the data channel, and the position of the resources for the dedicated pilots, according to the MCS level of the data channel.

13. The method of claim 12, further comprising, if it is determined that the dedicated pilots will not be received, receiving a data channel signal including data mapped to the resources allocated to the data channel without the dedicated pilots, using the first channel estimate, and acquiring the data from the data channel signal using the first channel estimate.

14. The method of claim 10, wherein the threshold is determined according to a radio transmission scheme of the data channel and characteristics of the data channel, and broadcast by a system.

15. The method of claim 12, wherein determining at least one of whether the dedicated pilots will be received, a ratio of the dedicated pilots relative to the resources allocated to the data channel, and the position of the resources for the dedicated pilots comprises determining whether the dedicated pilots will be received and the amount of resources for the dedicated pilots according to the MCS level, referring to a look-up table listing transmission or non-transmission of dedicated pilots and amounts of resources for the dedicated pilots with respect to available MCS levels for the data channel.

16. The method of claim 15, wherein the look-up table is determined according to a radio transmission scheme of the data channel and characteristics of the data channel, and broadcast by a system.

17. The method of claim 10, wherein determining the amount of resources for dedicated pilots comprises receiving dedicated pilot information indicating at least one of transmission or non-transmission of the dedicated pilots, the amount of resources for the dedicated pilots, and the position of the resources for the dedicated pilots, and determining the amount of resources for the dedicated pilots according to the dedicated pilot information.

18. An apparatus for controlling transmission of dedicated pilots in a wireless communication system, comprising:
    a scheduler for determining a Modulation and Coding Scheme (MCS) level for a data channel, determining amount of resources for dedicated pilots in inverse proportion to the MCS level, determining that the dedicated pilots will be sent, if the MCS level is less than or equal to a predetermined threshold, and determining to map the dedicated pilots to the determined amount of resources being part of the resources allocated to the data channel, when it is determined that the dedicated pilots will be sent;
    a pilot channel generator for generating basic pilots to be mapped to resources allocated to a pilot channel and generating the dedicated pilots to be mapped to the determined amount of resources being part of resources allocated to a data channel;
    a control channel generator for generating control information to be mapped to resources allocated to a control channel;
    a data channel generator for generating data to be mapped to remaining resources allocated to the data channel excluding the resources allocated to the dedicated pilots; and
    a resource mapper for generating a pilot channel signal by mapping the basic pilots to the resources allocated to the pilot channel, generating a control channel signal by mapping the control information to the resources allocated to the control channel, and generating a data channel signal by mapping the dedicated pilots and the data to the resources allocated to the data channel, multiplexing the pilot channel signal, the control channel signal, and the data channel signal, and sending the multiplexed signal in the mapped resources.

19. The apparatus of claim 18, wherein the data channel generator generates the data by puncturing or repeating a coded information bit sequence to be sent on the data channel according to the determined amount of resources for the dedicated pilots.

20. The apparatus of claim 18, wherein the scheduler determines at least one of whether the dedicated pilots will be sent, a ratio of the dedicated pilots relative to the resources allocated to the data channel, and the position of the resources for the dedicated pilots, according to the determined MCS level for the data channel.

21. The apparatus of claim 20, wherein the data channel generator generates a data channel signal including data mapped to the resources allocated to the data channel without the dedicated pilots, if it is determined that the dedicated pilots will not be sent.

22. The apparatus of claim 18, wherein the threshold is determined according to a radio transmission scheme of the data channel and characteristics of the data channel, and broadcast by a system.

23. The apparatus of claim 20, wherein the scheduler determines whether the dedicated pilots will be sent and the amount of resources for the dedicated pilots according to the MCS level, referring to a look-up table listing transmission or non-transmission of dedicated pilots and amounts of resources for the dedicated pilots with respect to available MCS levels for the data channel.

24. The apparatus of claim 23, wherein the look-up table is determined according to a radio transmission scheme of the data channel and characteristics of the data channel, and broadcast by a system.

25. The apparatus of claim 18, wherein the scheduler sends dedicated pilot information indicating at least one of transmission or non-transmission of the dedicated pilots, the amount of resources for the dedicated pilots, and the position of the resources for the dedicated pilots.

26. The apparatus of claim 18, wherein the dedicated pilots are used together with the basic pilots for channel estimation and channel compensation of the data channel.

27. An apparatus for controlling reception of dedicated pilots in a wireless communication system, comprising:
    a resource demapper for demapping a signal received from a transmitter into a data channel signal received through resources allocated to a data channel, a control channel signal received through resources allocated to a control channel, and a pilot channel signal received through resources allocated to a pilot channel;
    a channel estimator for calculating a first channel estimate using basic pilots included in the pilot channel signal, and if the data channel signal includes dedicated pilots, calculating a second channel estimate using the dedicated pilots;
    a control channel receiver for acquiring control information indicating a Modulation and Coding Scheme (MCS) level used for the data channel using the first channel estimate, determining the amount of resources for the dedicated pilots in inverse proportion to the MCS level of the data channel, determining that the dedicated pilots will be received, if the MCS level is less than or equal to a predetermined threshold, determining to map the dedicated pilots to the determined amount of resources being part of the resources allocated to the data channel, when it is determined that the dedicated pilots will be received, and controlling the resource demapper and the channel estimator based on the determining results; and
    a data channel receiver for acquiring data from the data channel signal using at least one of the first channel estimate and the second channel estimate.

28. The apparatus of claim 27, wherein the data channel receiver outputs a coded information bit sequence by combining repeated bits included in the data or depuncturing punctured bits of the data, according to the amount of resources for the dedicated pilots.

29. The apparatus of claim 27, wherein the control channel receiver determines at least one of whether the dedicated pilots will be received, a ratio of the dedicated pilots relative to the resources allocated to the data channel, and the position of the resources for the dedicated pilots, according to the MCS level used for the data channel.

30. The apparatus of claim 29, wherein if it is determined that the dedicated pilots will not be received, the data channel receiver receives a data channel signal including data mapped to the resources allocated to the data channel without the dedicated pilots, using the first channel estimate, and acquires the data from the data channel signal using the first channel estimate.

31. The apparatus of claim 27, wherein the threshold is determined according to a radio transmission scheme of the data channel and characteristics of the data channel, and broadcast by a system.

32. The apparatus of claim 29, wherein the control channel receiver determines whether the dedicated pilots will be received and the amount of resources for the dedicated pilots according to the MCS level, referring to a look-up table listing transmission or non-transmission of dedicated pilots and amounts of resources for the dedicated pilots with respect to available MCS levels for the data channel.

33. The apparatus of claim 32, wherein the look-up table is determined according to a radio transmission scheme of the data channel and characteristics of the data channel, and broadcast by a system.

34. The apparatus of claim 27, wherein the control channel receiver receives dedicated pilot information indicating at least one of transmission or non-transmission of the dedicated pilots, the amount of resources for the dedicated pilots, and the position of the resources for the dedicated pilots, and determines the amount of resources for the dedicated pilots according to the dedicated pilot information.

\* \* \* \* \*